US005848340A

United States Patent [19]

Enomoto et al.

[11] Patent Number: 5,848,340

[45] Date of Patent: Dec. 8, 1998

[54] TRANSFER DRUM

[75] Inventors: Yoshihiro Enomoto; Junichirou Sameshima; Yukio Hayashi, all of Ebina, Japan

[73] Assignee: Fuji Xerox Co., Ltd., Tokyo, Japan

[21] Appl. No.: 716,528

[22] Filed: Sep. 19, 1996

[30] Foreign Application Priority Data

Sep. 20, 1995 [JP] Japan .................................... 7-242140

[51] Int. Cl.$^{6}$ ...................................................... C03G 15/16

[52] U.S. Cl. ............................................ 399/303; 399/121

[58] Field of Search .................................... 399/121, 297, 399/303, 304, 310, 312

[56] References Cited

FOREIGN PATENT DOCUMENTS

A-4-274269 9/1992 Japan .
5-061363 3/1993 Japan .

*Primary Examiner*—William J. Royer
*Assistant Examiner*—Quana Grainger
*Attorney, Agent, or Firm*—Oliff & Berridge, PLC

[57] ABSTRACT

A transfer drum includes a pair of annular frames, a coupling member for coupling the annular frames, and a transfer material holding member being wrapped around the annular frames. In the transfer drum, the coupling member is attached so that a top face of a main body, other than attachment ends of the coupling member, is positioned relative to the annular frames to be lower than outer peripheral surfaces of the annular frames. The transfer material holding member has ends in a circumferential direction overlapped on and bonded to each other and ends in an axial direction stuck to the outer peripheral surfaces of the annular frames. The transfer material holding member is attached so that it is placed out of contact with the top face of the main body of the coupling member.

5 Claims, 11 Drawing Sheets

TRANSFER DRUM

BACKGROUND OF THE INVENTION

This invention relates to a transfer drum for holding a transfer material for transferring a toner image formed on an image support and transporting the transfer material to a transfer section in a transfer system applied to an image formation system such as a copier or a printer.

Some of conventional transfer systems for transferring a toner image formed on a photosensitive drum, for example, by an electrophotographic system to a transfer material such as a recording sheet comprise a transfer drum for supporting the transfer material and transporting it to a transfer section opposed to the photosensitive drum, then stripping off the transfer material after completion of the transfer.

Such a transfer drum basically comprises a drum frame including a pair of annular frames placed in parallel and a coupling member for coupling the annular frames, and a sheet-like transfer material holding member which winds along the outer peripheral surfaces of the annular frames to form a cylinder. It rotates in synchronization with a photosensitive drum and electrostatically attracts a transfer material to the outer peripheral surface of the transfer material holding member for transporting the transfer material. The following is known as an assembly structure of the transfer drum:

For example, as shown in FIGS. 12A–12C, in the transfer drum, a coupling member 101 is attached to a pair of annular frames placed in parallel for forming a drum frame 102. A transfer material holding member 103 like a sheet is attached to the coupling member 101 by screwing both front and rear ends 103*a* and 103*b* of the transfer material holding member 103. That is, a fixing member 104 is composed of an elastic material, a resin plate, and a metal plate bonded in combination and has a large number of fixing screw holes. Both the front and rear ends 103*a* and 103*b* of the transfer material holding member are attached to the fixing member 104. Both the front and rear ends 103*a* and 103*b* are fixed to attachment parts of the coupling member 101 by screws (105) and both left and right ends 103*c* and 103*d* of the transfer material holding member are stuck to the outer peripheral surface of the annular frame 101, thereby placing the sheet-like transfer material holding member 103 on the drum frame 102 like a cylinder. Numeral 106 in FIG. 12 denotes a transfer material.

However, the transfer drum of the assembly structure requires that the distance between the top face of the coupling member 101 and the photosensitive drum 107 should be measured for adjusting the attachment height of the coupling member with a spacer, etc., to accurately hold the gap between the transfer drum (outer peripheral surface of the transfer material holding member) and the photosensitive drum 107 constant; moreover, when the transfer material holding member is attached, if the rear end 103*b* thereof is not parallel with the coupling member 101 and the screw hole positions do not match, the transfer material holding member 103 must be again attached from the beginning and the assembly work is intricate. The transfer drum also requires the parts such as the fixing member 104 and screws to attach the transfer material holding member 103. In addition, an adjust plate 108 for preventing the transfer material holding member 103 from hanging down must be attached to the annular frame 100 near upstream in the drum rotation direction of the coupling member 101. A large number of parts are required for assembling the transfer drum, increasing costs. Further, such intricate assembly work and many parts also produce a largely adverse effect when the transfer material holding member 103 is replaced.

Unexamined Japanese Patent Publication 4-274269 discloses a transfer drum of the type wherein to improve assemblability and replaceability of a transfer material holding member, a rigid member and an elastic member are disposed integrally at the tip of a sheet-like transfer material holding member, the tip is fixed to a coupling member fixing member, and the rear end of the transfer material holding member is overlapped on the previously fixed tip and fixed.

However, the transfer drum disclosed here requires the additional rigid member and elastic member for attaching the transfer material holding member, increasing costs. Since the transfer drum takes the structure wherein the tip and rear end of the transfer material holding member are fixed to the coupling member, the attachment accuracy of the transfer material holding member is affected by that of the coupling member and it is difficult to provide assembly accuracy of the transfer drum.

SUMMARY OF THE INVENTION

It is therefore an object of the invention to provide a transfer system which enables the operator (user) to more accurately and simply attach and replace a transfer material holding member in a transfer drum without increasing costs.

According to the invention, there is provided a transfer drum comprising a pair of annular frames, a coupling member for coupling the annular frames, and a transfer material holding member like a sheet being wrapped around the annular frames, characterized in that the transfer material holding member is attached to the annular frames in a state in which it is placed out of contact with the coupling member.

Preferably, the transfer material holding member is attached so that its overlap bonding part is positioned above the coupling member. In this case, preferably each of the attachment ends of the coupling member to the annular frames comprises a transfer material holding member sticking part comprising a lower face part lower than the outer peripheral surface of the annular frame and top face parts positioned before and after the lower face part and as high as the outer peripheral surface of the annular frame, wherein the overlap bonding part of the transfer material holding member is positioned on the lower face part. Further, to use the transfer drum as a transfer drum of an image formation system of the type wherein an image density adjustment patch is formed, preferably the transfer material holding member is formed with a notch in a part corresponding to a patch image formation position at the rear end of the holding member and the notch forms a level difference in the overlap bonding part, thereby preventing the patch image from being transferred onto the transfer material holding member.

Preferably, an elastic member like a sheet is attached to a top face of a main body of the coupling member so that both ends of the elastic member protrude from the main body and approach an inner peripheral surface of the transfer material holding member. If the transfer drum comprises an inner push member for pressing and deforming the transfer material holding member from the inside to strip off a transfer material from the transfer drum, preferably the coupling member is formed with a notch in a part of the coupling member that the inner push member abuts.

According to the invention, the transfer material holding member can be attached by extremely simple work of overlapping and bonding both the front and rear ends of the transfer material holding member parallel with the rotation shaft direction of the transfer drum and sticking both the left and right ends of the transfer material holding member perpendicular to the rotation shaft direction of the transfer drum to the outer peripheral surfaces of the annular frames. The transfer material holding member is placed out of contact with the top face of the main body of the coupling member and need not be fixed to the coupling member.

BRIEF DESCRIPTION OF THE DRAWING

In the accompanying drawings:

FIG. 6A is a perspective view, FIG. 6B is a sectional view taken on line B—B, and FIG. 6C is a plan view;

FIG. 12A is a perspective view to show a drum frame of the transfer drum, FIG. 12B is a perspective view of the main part to show an attachment structure of a transfer material holding member, and FIG. 12C is a sectional view to show a structure in the vicinity of a coupling member of the transfer drum.

DETAILED DESCRIPTION OF PREFERRED EMBODIMENTS

Figure 1:
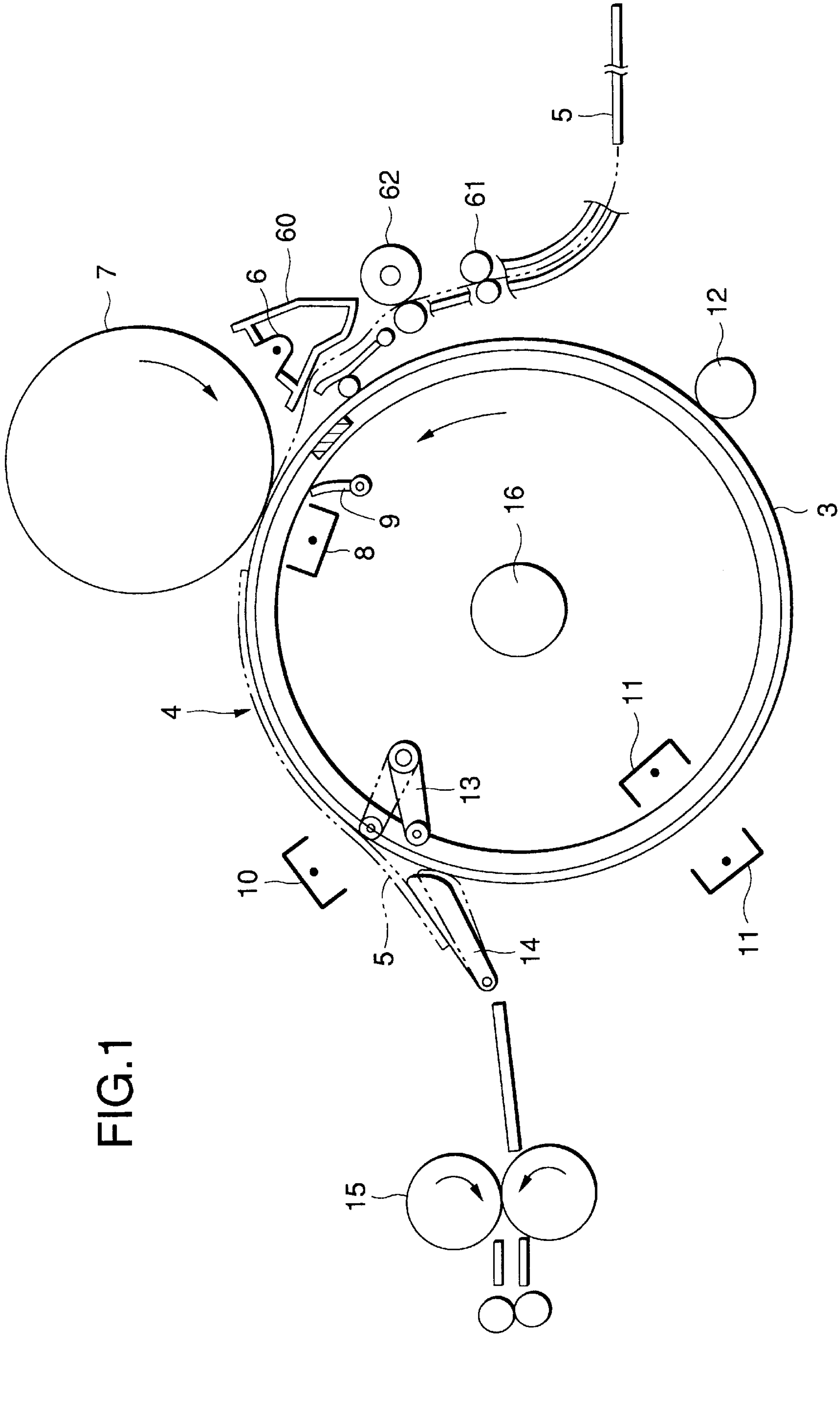
FIG. 1 is a conceptual diagram to show one embodiment of a transfer system.
Figure 2:
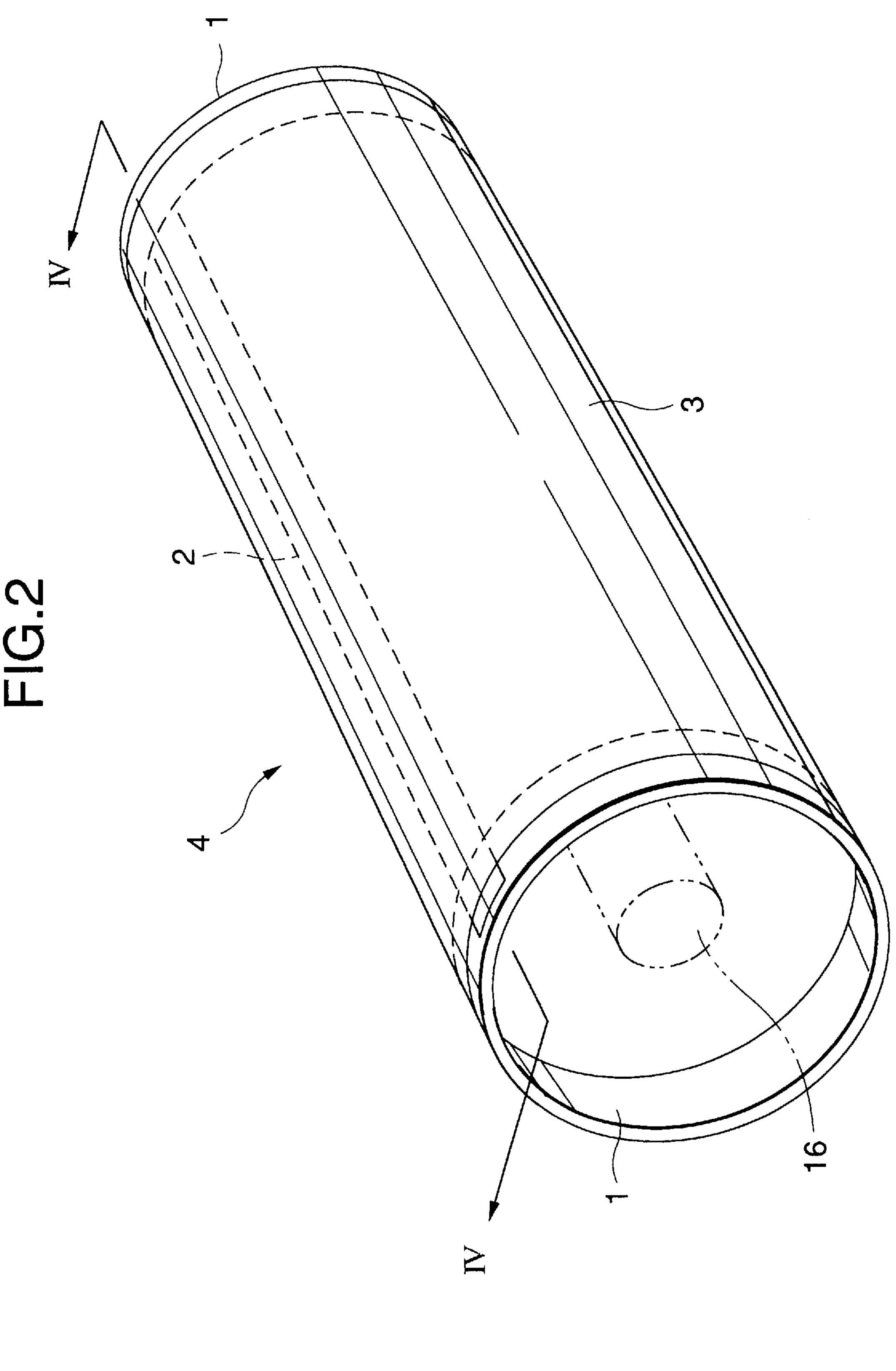
FIG. 2 is a perspective view to show the whole of a transfer drum according to the invention.
Figure 3:
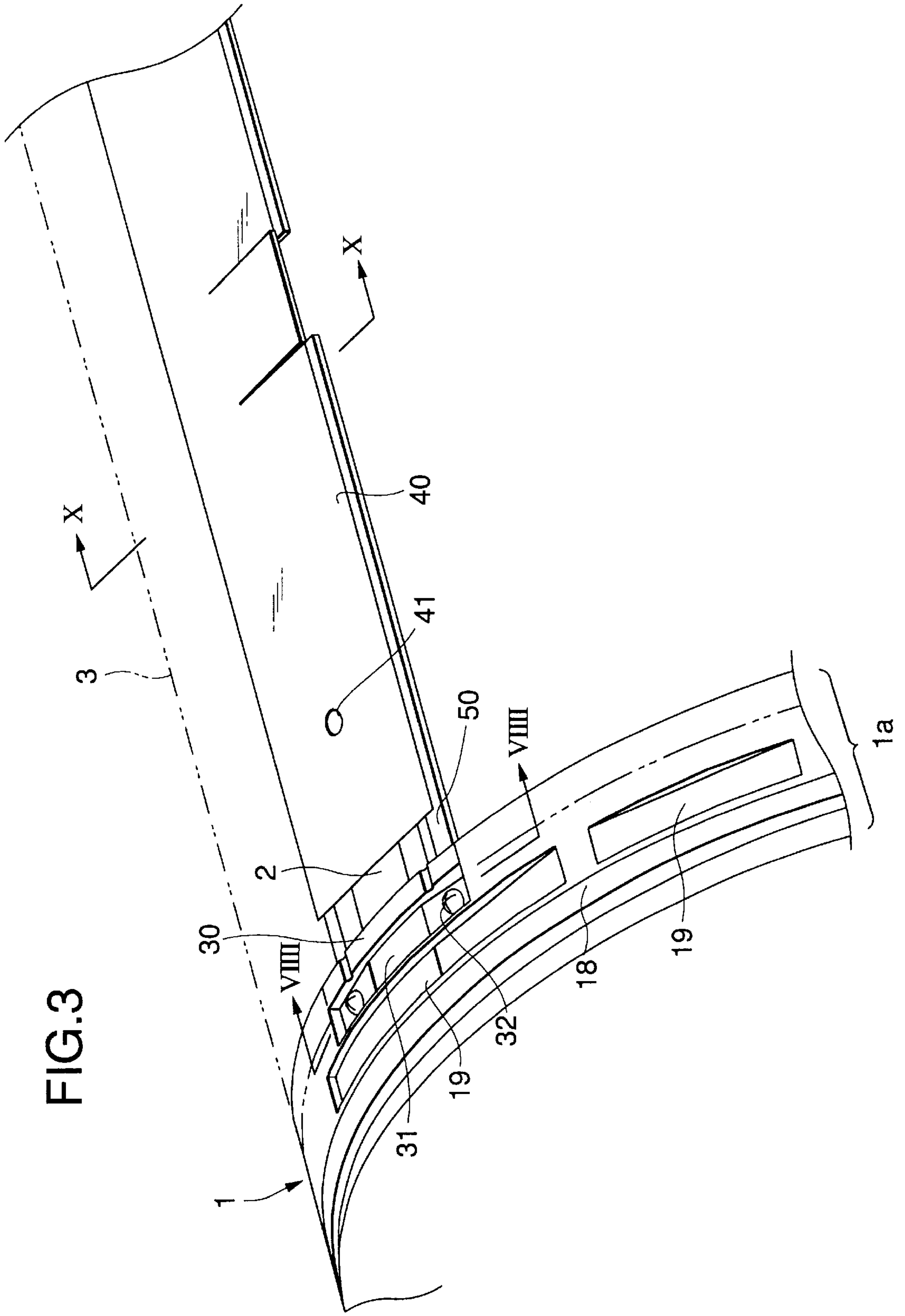
FIG. 3 is a partially enlarged perspective view of the transfer drum according to the invention.
Figure 4:
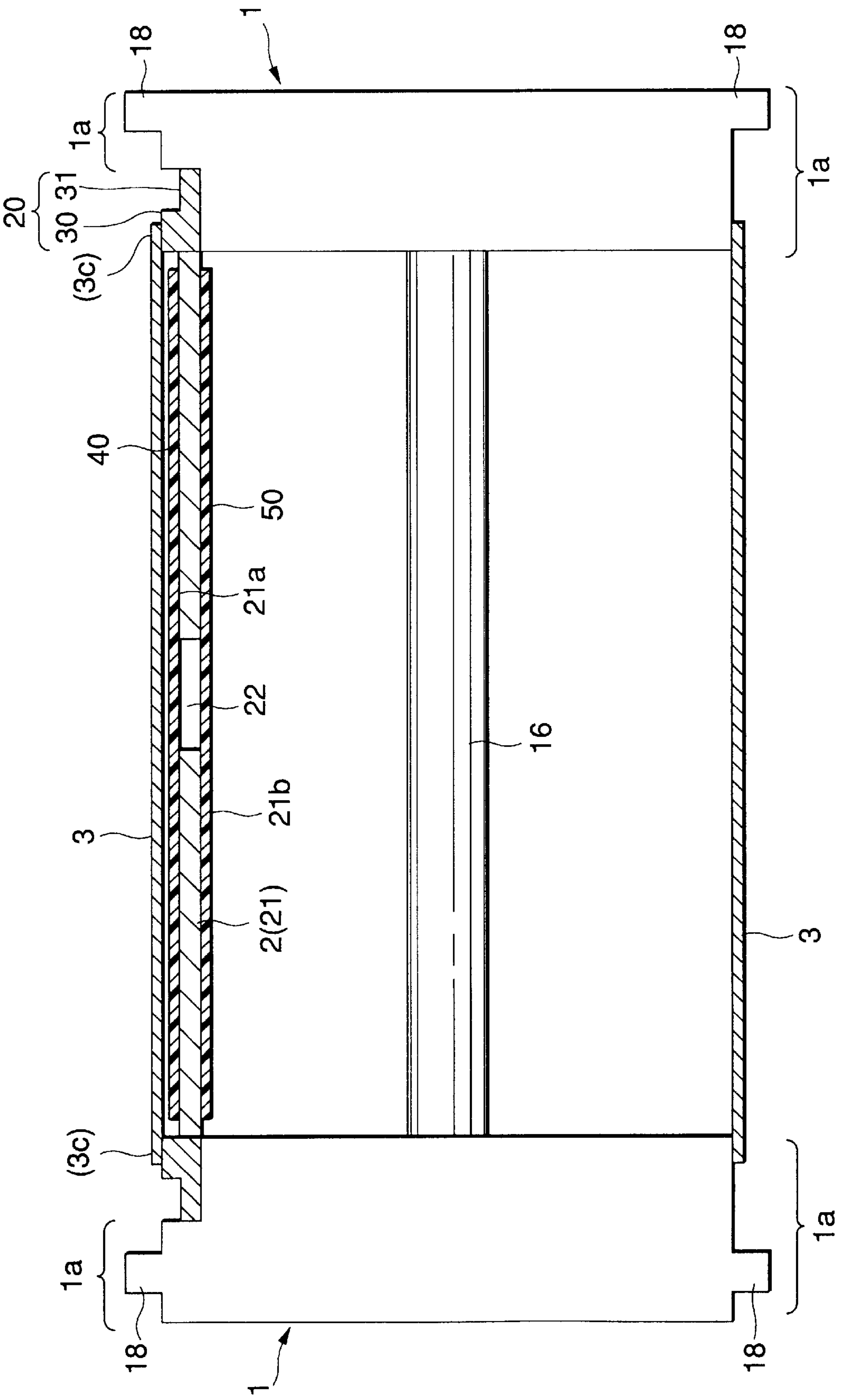
FIG. 4 is a sectional view taken on line IV–IV of FIG. 2.

FIGS. 1–4 show one embodiment of a transfer system according to the invention. FIG. 1 is a conceptual diagram to show a general configuration of the transfer system. FIG. 2 is a perspective view to show a transfer drum. FIG. 3 is a partially enlarged perspective view of the transfer drum. FIG. 4 is a sectional view taken on line IV–IV of FIG. 2.

The transfer drum basically comprises a transfer drum 4 consisting of rings 1 and 1 as a pair of annular frames placed left and right in parallel, a coupling member 2 for coupling the rings 1 and 1, and a drum sheet 3 as a sheet-like transfer material holding member wrapped like a cylinder along the outer peripheral surfaces of the rings 1 and 1. Disposed surrounding the transfer drum 4 are an attraction and transfer corotron 8 for attracting and charging the drum sheet 3 to attract and hold a transfer material 5 such as a recording sheet of paper and transferring a toner image on an image formation body 7 such as a photosensitive drum to the transfer material 5, a transfer baffle 9 for performing attachment/detachment operation of pressing the drum sheet 3 from the inside against the surface of the image formation body 7 at the transfer time, an electricity removal corotron 10 for removing electricity of the transfer material 5 where a transfer step is complete, cleaning electricity removal corotrons 11 for removing charge on the drum sheet 3 where a transfer step is complete, a cleaning brush 12 for cleaning paper powder, toner, etc., deposited on the drum sheet 3 where a transfer step is complete, an inner push roll 13 for pushing up the drum sheet 3 from the inside when the transfer material 5 is stripped off, and a stripping finger 14 for stripping off the transfer material 5.

In FIG. 1, numeral 6 is a before-transfer corotron, numeral 15 is a fuser for fixing a toner image on the transfer material 5 after transfer completion, numeral 60 is a duct shoot of the corotron 6, numeral 61 is a register roll for feeding the transfer material 5 at a predetermined timing, and numeral 62 is a roll curler for curling the transfer material 5 such as a thick sheet of paper so that the transfer material 5 is easily attracted along the attraction face of the transfer drum 4. In FIGS. 1 and 2, numeral 16 is a rotation shaft of the transfer drum 4 disposed between the rings 1 and 1.

The transfer drum can be applied if it is an image formation system of the type wherein a toner image formed on the image formation body 7 by an electrophotographic system or an electrostatic recording system is transferred to the recording material 5 held on the transfer drum 4 and transported. However, the embodiment applies the transfer drum to a color copier of the electrophotographic system. Therefore, the transfer drum according to the embodiment operates as follows:

The transfer drum 4 rotates in synchronization with the image formation body (photosensitive drum) 7 provided with an image formation process unit of an electrophotographic system (not shown) for electrostatically attracting the transfer material 5 supplied from a paper feed tray, etc., via the register roller 61 at a predetermined timing (curled by the curler 62 as required) onto the drum sheet 3 by attracting and charging of the attraction and transfer corotron 8 and pressing of the transfer baffle 9. At the same time as the attracting, a toner image formed on the photosensitive drum 7 in an electrophotographic image formation process by attracting and charging of the attraction and transfer corotron 8 is electrostatically transferred to the transfer material 5 attracted to the transfer drum 4. To form a full color image, etc., the transfer drum 4 rotates with the transfer material 5 held for allowing as many transfer positions opposed to the photosensitive drum 7 as the number of transfer steps to pass through and transferring toner images of the second and later colors formed in sequence on the photosensitive drum 7 to the transfer material 5 in sequence. Upon completion of transferring the toner image of the last color, the inner push roller 13 pushes up and deforms the drum sheet 3 and the stripping finger 14 abuts the surface of the drum sheet 3. While electricity of the transfer material 5 after transfer completion is being removed by the electricity removal corotron 10, the transfer material 5 undergoes action of the inner push roll 13 and the stripping finger 14 and is stripped off from the drum sheet 3. The transfer material 5 stripped off is sent to the fuser 15 where the transferred toner image is fixed. On the other hand, for the transfer drum 4 from which the transfer material has been stripped off, charge on the drum sheet 3 is removed by the cleaning electricity removal corotrons 11, then paper powder, etc., deposited on the drum sheet 3 is cleaned with the cleaning brush 12.

Next, the transfer drum 4 in the transfer system will be discussed in detail.

First, as shown in FIGS. 2–4, each of a pair of rings 1 and 1 is made of a circular ring having an outer peripheral surface 1*a* of a predetermined outer diameter dimension and a part of the outer peripheral surface 1*a* is formed with a tracking roll part 18 of a form protruding at a given height from the outer peripheral surface 1*a* for always abutting the outer peripheral surface of the photosensitive drum 7 so as to rotate with a given gap spaced from the photosensitive drum 7. Also, a part of the outer peripheral surface 1*a* of the ring 1 is formed with a stripping finger guide groove 19 shaped like a groove for guiding and regulating the displacement operation when the stripping finger 14 displaces and comes in contact with the surface of the transfer drum 4 (drum sheet surface) at a predetermined timing when stripping off a transfer material.

Figure 5:
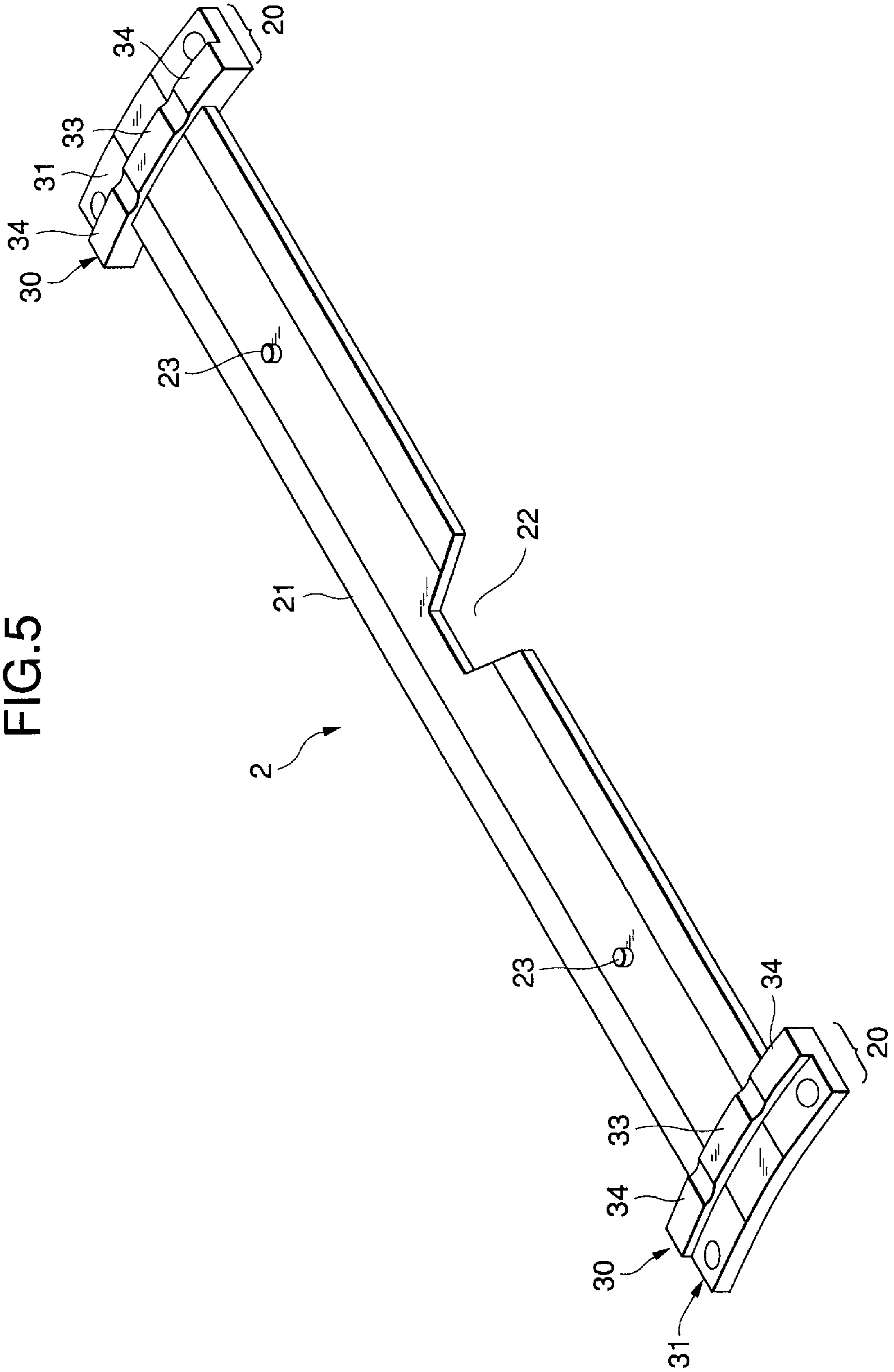
FIG. 5 is a perspective view to show the whole of a coupling member.

As shown in FIG. 5, the coupling member 2 for coupling the pair of rings 1 and 1 is made of a long plate substance and is formed at both left and right ends as attachment ends 20 for attaching to the rings 1 and 1 and in the central portion other than the attachment ends 20 as a main body 21.

The main body 21 of the coupling member has a form such that when the coupling member 2 is attached to the rings 1 and 1, a top face 21*a* of the main body is placed at a position lower than the outer peripheral surface 1*a* of the ring 1; in the example, the main body 21 is shaped so that the top face 21*a* is lower one stage than every top face of the attachment ends 20 (FIGS. 4 and 5). The main body 21 has a cross section as a taper face with four corners gently slanting so that the whole becomes a shape approximating to a streamline shape. It is formed in the vicinity of the center with a notch 22 so as to make necessary deformation of the drum sheet 3 by pressing when the inner push roll 13 operates when a transfer material is stripped off.

An elastic member 40 made of a polyethylene terephthalate (PET) sheet etc., is attached to the top face 21*a* of the main body 21 of the coupling member so as to protrude from both ends of the main body 21 to the upstream and downstream sides of the drum rotation direction. The elastic member 40 comprises a positioning hole 41 used when it is attached; it is attached while the position is being adjusted so as to match a positioning hole 23 made in the coupling member 2. Moreover, the elastic member 40 is attached so that both the ends 40*a* and 40*b* thereof approach the inner peripheral surface of the drum sheet 3 (see FIG. 10). The elastic member 40 serves a function of supporting the drum sheet 3 from the inside as required, as described later.

Figure 10:
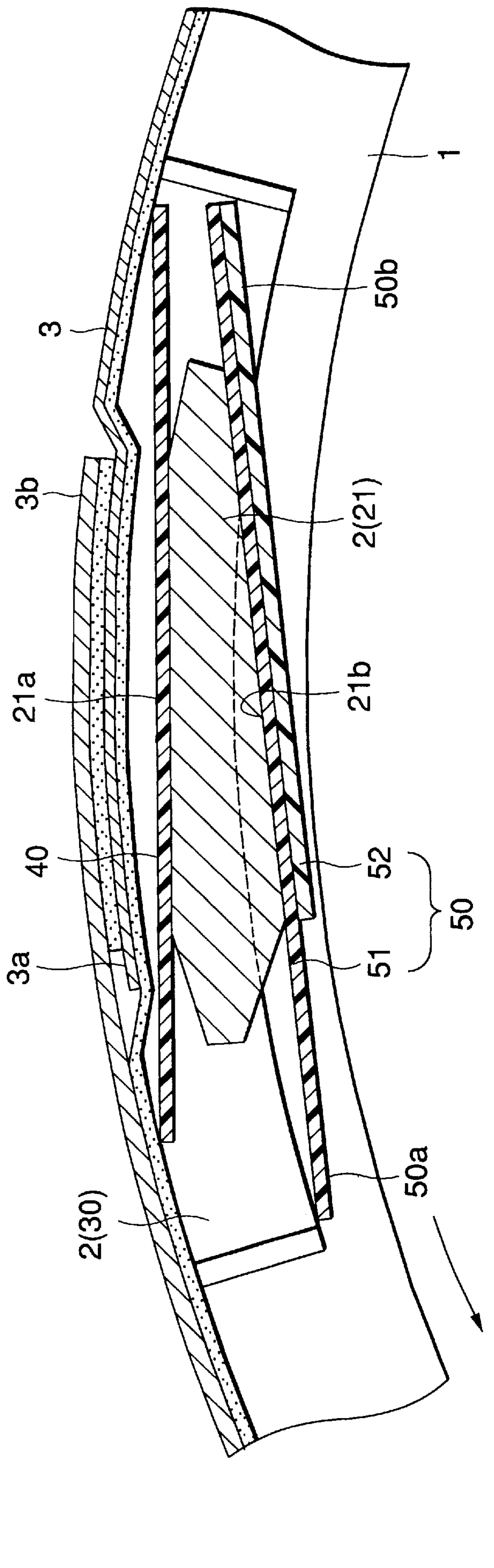
FIG. 10 is a sectional view taken on line X—X of FIG. 3.

Further, an elastic member 50 comprising a Teflon sheet 52, etc., stuck to an insulating sheet base material 51 made of polyethylene terephthalate (PET), etc., is attached to a bottom face 21*b* of the main body 21 of the coupling member so as to protrude from both ends of the main body 21 to the upstream and downstream sides of the drum rotation direction (see FIG. 10). The elastic member 50 serves a function of preventing vibration occurring when the transfer baffle 9 passes through the coupling member 2 as described later.

On the other hand, as shown in FIGS. 3–5 and 9, the attachment end 20 of the coupling member consists of a sheet sticking part 30 for sticking the drum sheet 3 and a fixing part 31 for fixing the coupling member to the ring 1. The entire attachment end is placed in an attachment recess made at a predetermined position of the outer peripheral surface of the ring 1, then the fixing part 31 is screwed by two screws 32, whereby the attachment end is fixed. The sheet sticking part 30 comprises a lower face part 33 lower than the outer peripheral surface 1*a* of the ring and top face parts 34 being positioned before and after the lower part face 33 along the drum rotation direction and as high as the outer peripheral surface 1*a* of the ring. The lower face part 33 is set so as to become lower than the top face part 34 as much as the thickness of the drum sheet 3 plus that of adhesive tape.

Figure 6A:
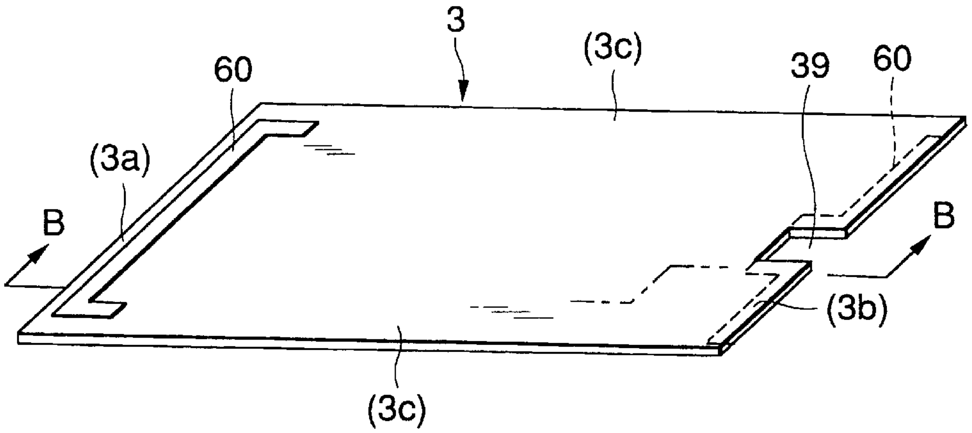
FIG. 6A to 6C show an expansion state of a transfer material holding member (drum sheet)
Figure 6B:
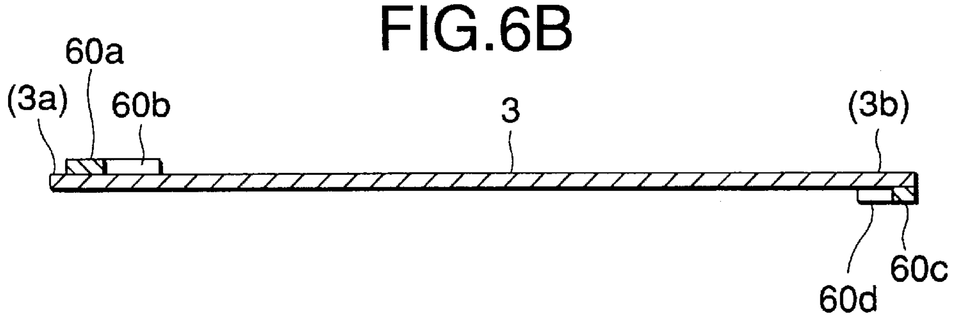
Figure 6C:
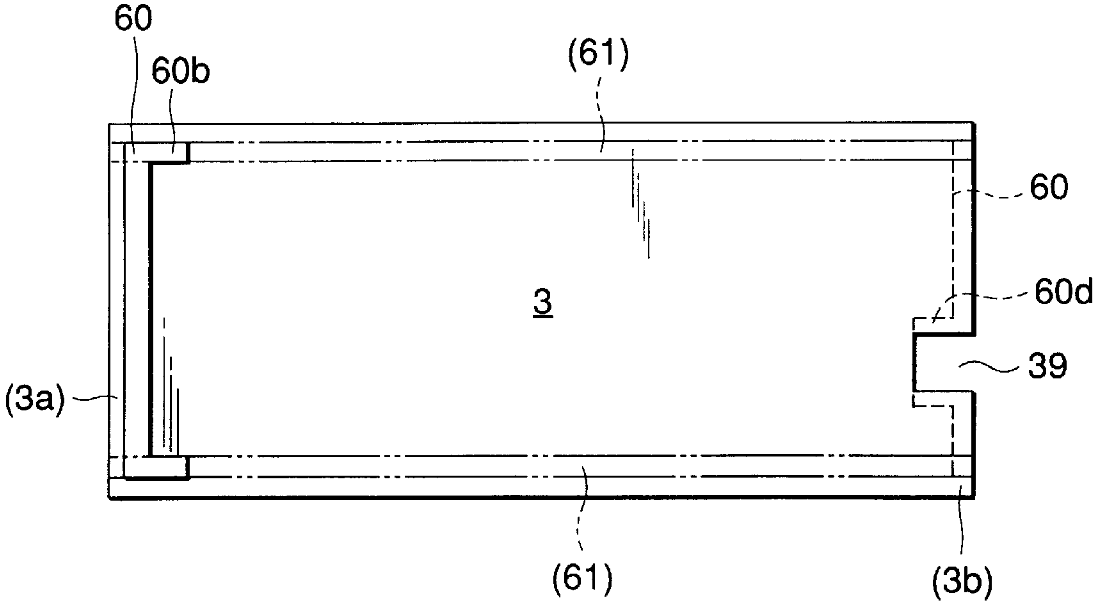

The drum sheet 3 is attached to the drum frame comprising a pair of rings 1 and 1 coupled by the coupling member 2 as follows:

First, as shown in FIG. 6, the drum sheet 3 is a sheet material having its expansion shape as almost a rectangle; the length in the long side direction is the length of the overlap of both the front and rear ends added to the outer peripheral length of the ring 1 and the length in the short side direction is the length of the sticking area to the ring 1 added to the gap of a pair of rings 1 placed in parallel. The drum sheet normally is about 150 $\mu$m thick. The short side which becomes the rear end of the drum sheet 3 is formed with a notch 39 at a position corresponding to the notch 22 made in the coupling member 2. The notch 39 forms a level difference when the drum sheet 3 is attached to the drum frame, thereby preventing a density sensing patch image formed on the photosensitive drum 7 to hold the image density constant from being transferred to the drum sheet 3.

As shown in FIG. 6, stuck to the drum sheet 3 is double-sided adhesive tape 60 about 3 mm wide used to overlap both ends of the short side of the drum sheet and bond them before the drum sheet 3 is attached. That is, double-sided adhesive tape 60*a* is stuck to a tip 3*a* of the drum sheet (outer peripheral surface side) along the short side thereof at a position about 0.5–1.0 mm inner from the tip, and double-sided adhesive tape 60*b* for positioning in the drum rotation shaft direction is stuck to both ends of the adhesive tape 60*a*. Double-sided adhesive tape 60*c* is stuck to a rear end 3*b* of the drum sheet (inner peripheral surface side) from the end, and double-sided adhesive tape 60*d* as long as the adhesive tape 60*b* is stuck to a part of the notch 39.

On the other hand, double-sided adhesive tape 61 for sticking the drum sheet 3 is also stuck to all the outer peripheral surface 1*a* of the ring 1 containing the sheet sticking part 30 of the coupling member. Alternate long and two short dashes lines in FIG. 6*c* indicate portions of the drum sheet 3 opposed to the double-sided adhesive tape 61.

Figure 7:
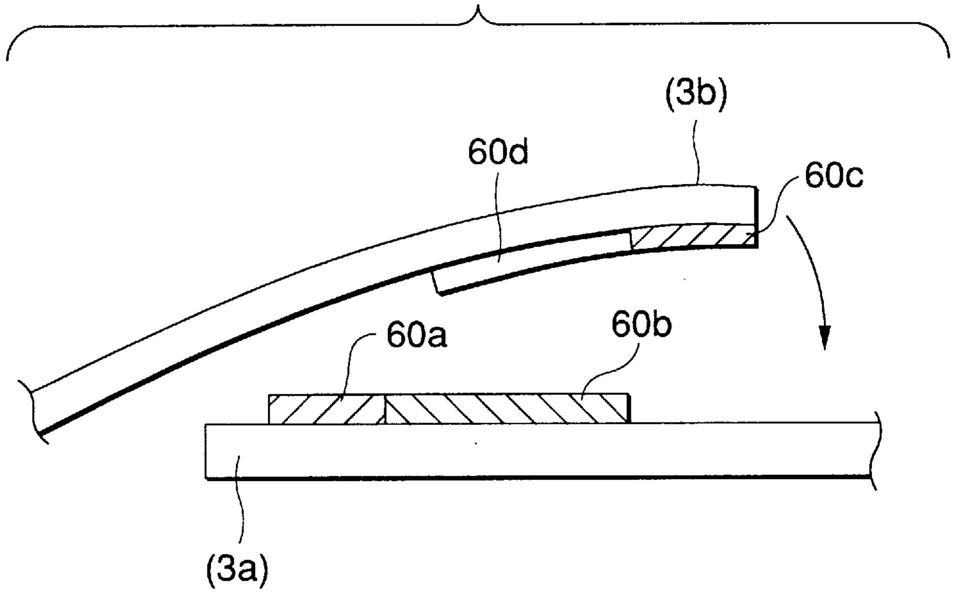
FIG. 7 is an illustration to show a work state of overlapping and bonding both front and rear ends of the transfer material holding member.

To stick the drum sheet 3, first the tip 3*a* of the drum sheet 3 is stuck to the rings 1 and 1 to which the double-sided adhesive tape 61 has been stuck, with the double-sided adhesive tapes 60*a* and 60*b* upward at predetermined positions of the lower face parts 33 of the sheet sticking parts 30 of the coupling member (downstream in the drum rotation direction). Next, the ring 1 is rotated in the state, whereby both the ends 3*c* of the long sides of the drum sheet 3 are stuck to the outer peripheral surfaces 1*a* of the rings (containing the sheet sticking parts 30) via the double-sided adhesive tape 61. Last, in the lower face parts 33 of the sheet sticking parts 30, the rear end 3*b* of the drum sheet with both the ends 3*c* of the long sides stuck is bonded to the sheet tip 3*a* previously stuck so as to overlap on the sheet tip (see FIG. 7).

To overlap and bond both the front and rear ends of the drum sheet, pressure of about 0.2–0.3 kg is applied from the center of the double-sided adhesive tape 60*a* to the rings 1 and 1, then pressure of about 0.2–0.3 kg is applied from the upstream side to downstream side of the drum rotation direction along the direction of the double-sided adhesive tape 60*b*, 60*d*, whereby the tip 3*a* and the rear end 3*b* of the drum sheet are bonded with a predetermined overlap area width so as to be regulated by the adhesive tape 60*b,* etc.

The transfer drum 4 thus assembled is attached to the drum frame 3 with both the side ends 3*c* of the long sides of the drum sheet 3 stuck only to the outer peripheral surfaces la of the rings (see FIG. 4). Both the front and rear ends 3*a* and 3*b* of the short sides of the drum sheet 3 are simply overlapped and bonded and the drum sheet 3 is placed out of contact with the top face 21*a* of the main body of the coupling member 2 (see FIGS. 9 and 10). Further, the overlap bonding area of both the front and rear ends of the drum sheet 3 is positioned on the lower face part 33 of the sheet sticking part 30 of the coupling member 2, and the lower face part 33 is preset lower as much as the overlap as described above, thus the outer peripheral surface of the rear end 3*b* of the drum sheet in the overlap area is held as high as the sheet area face stuck directly to the outer peripheral surface of the ring (see FIG. 9).

Therefore, with the transfer drum 4 of such an assembly structure, not only assembly of the transfer drum, but also replacement of the drum sheet 3 can be performed extremely easily and rapidly. Moreover, if the outer peripheral surface 1*a* of the ring 1 is high in dimension accuracy, the position of the outer peripheral surface of the drum sheet 3 is also determined by the outer peripheral surface 1*a* of the ring 1, so that the drum sheet can also be attached accurately. Since attachment means such as screwing is not required, a problem that sticking must be again performed from the beginning because of position differences of screw holes, etc., as in the conventional products does not occur.

In the transfer drum 4, the transfer material 5 can be electrostatically attracted to any area if the area is on the drum sheet not overlapping the coupling member 2.

Figure 11:
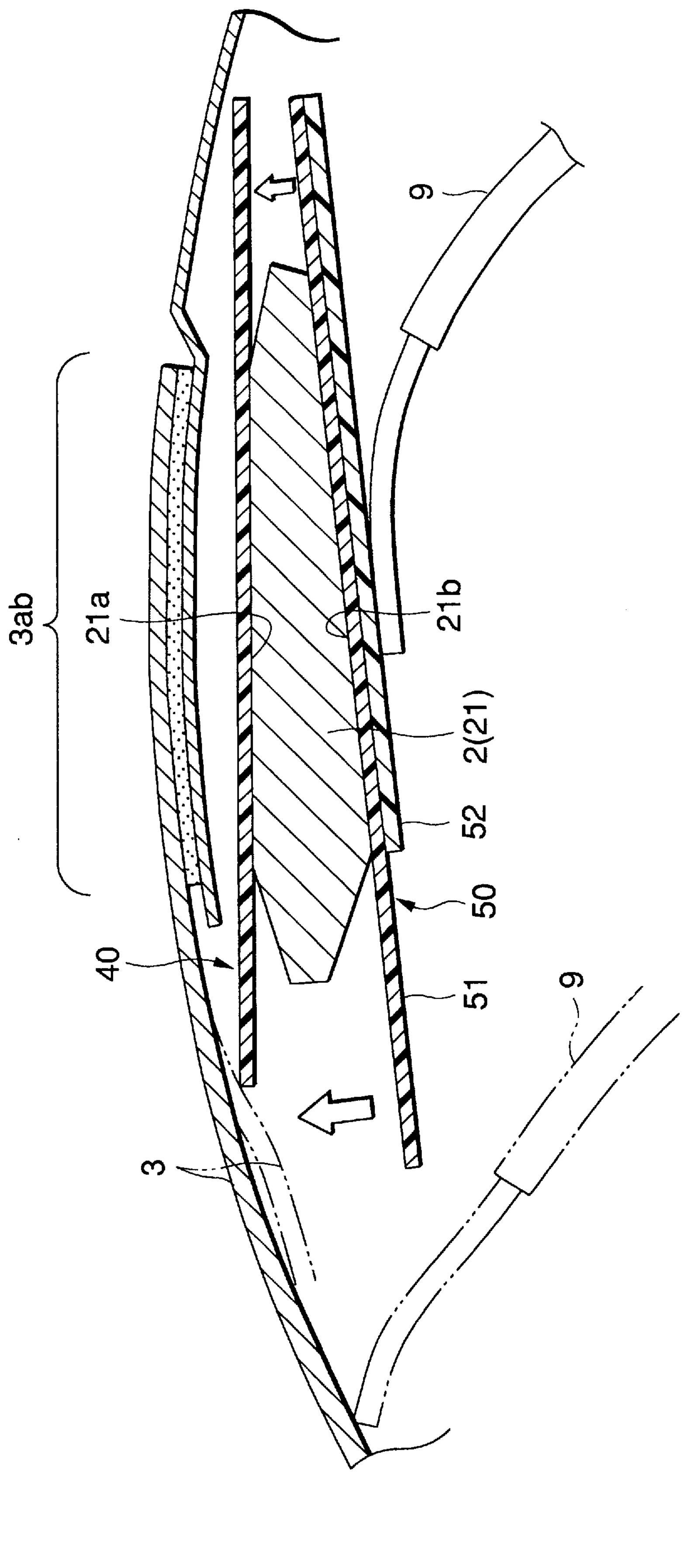
FIG. 11 is a sectional view of the main part to explain functions of elastic members attached to the top and lower faces of a coupling member.
Figure 12A:
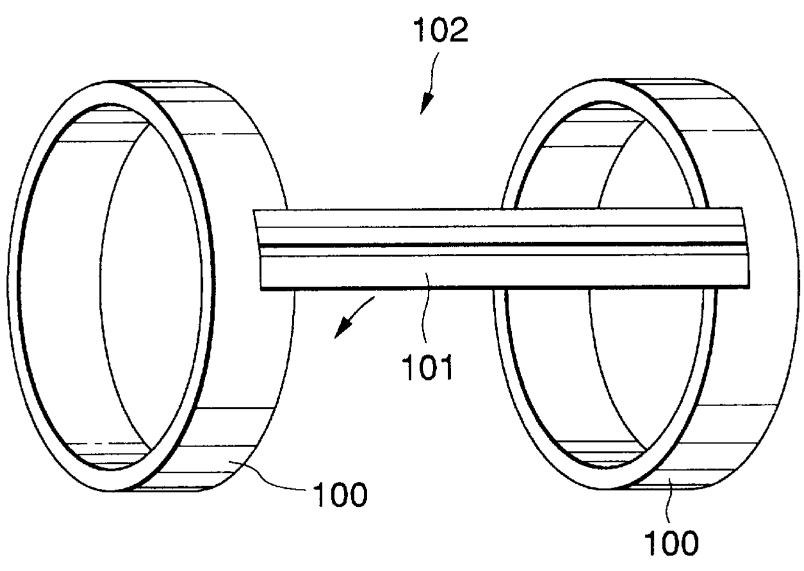
FIG.12A RELATED ART
FIGS. 12A to 12C show a conventional transfer drum.
Figure 12B:
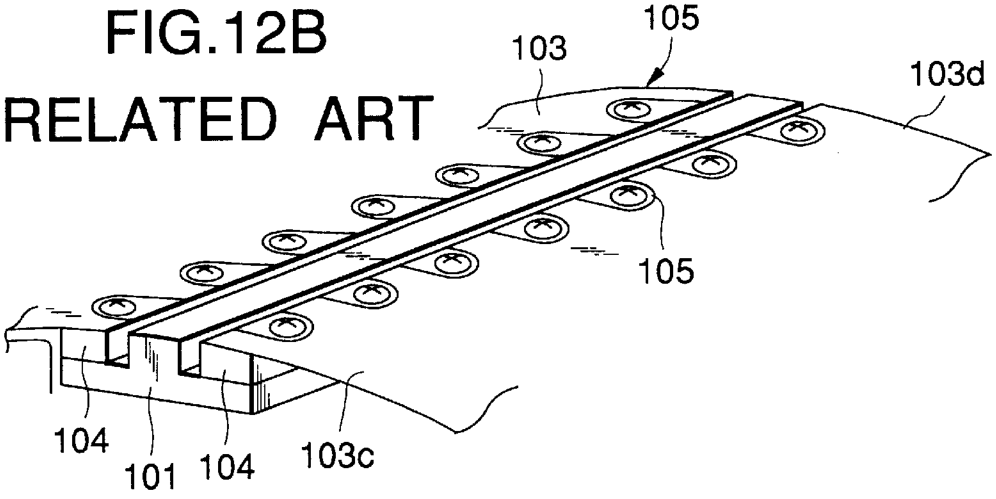
FIG.12B RELATED ART
Figure 12C:
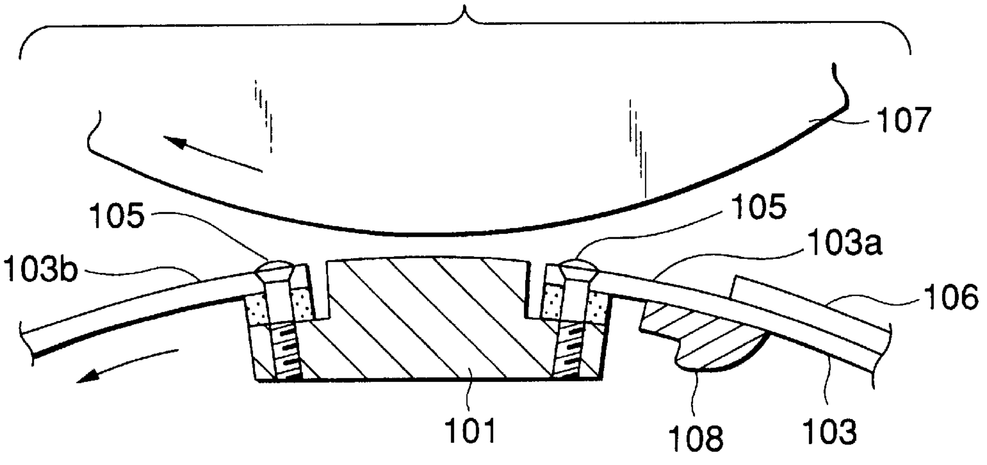
FIG.12C RELATED ART

As shown in FIG. 11, even if the drum sheet 3 shrinks due to change of environmental conditions of temperatures, etc., (for example, see alternate long and two short dashes lines in the figure), the elastic member 40, which is disposed on the top face of the main body of the coupling member 2, supports the drum sheet 3 deformed due to thermal shrinkage, etc., from the inside, whereby the height of the outer peripheral surface of the drum sheet 3 less changes and the gap between the surface of the drum sheet 3 of the transfer drum 4 and the photosensitive drum 7 is held within a given range, so that stabler transfer can be provided. Further, in the transfer drum 4, the drum sheet 3 mainly is attached to the rings 1 rather than fixed to the coupling member 2 (moreover, the ends of the elastic member 40 are not fixed to the coupling member 2 and are disposed so as to approach the inner face of the drum sheet 3), thus eliminating a sheet bend that can occur in the drum sheet 3 portions near the front and rear of the coupling member 2 and enabling the drum sheet 3 to be attached with no sheet bend along (the curvature) of the outer peripheral surfaces of the rings 1. Resultantly, the adjust plate as in the conventional product discussed above need not be provided.

Also, as shown in FIG. 11, in the transfer drum, the transfer baffle 9 operates in a transfer step for pressing the drum sheet 3 from the inside and passing through the lower face of the coupling member 2 while pressing the lower face so as to come in sliding contact with the lower face from the inside (in fact, the coupling member 2 passes through the transfer baffle 9). However, since the elastic member 50 is disposed on the lower face of the coupling member 2, the transfer baffle 9 arrives at the lower face of the coupling member 2 and passes therethrough while coming in contact with the elastic member 50 that can be elastically deformed, whereby shock occurring when the transfer baffle 9 collides with the lower face of the coupling member 2 and shock occurring when the transfer baffle 9 passes through the lower face of the coupling member 2 and comes in contact with the inner peripheral surface of the drum sheet 3 are absorbed by the elastic deformation of the elastic member 50 (in the arrow direction in the figure), thus preventing propagation of such shock to the photosensitive drum 7 from disturbing latent image write (image exposure). From the viewpoint of such a shock absorbing effect, preferably the protruding amounts of the elastic member 50 from both the ends of the coupling member 2 are set to about 5–10 mm on a downstream side 50*a* in the drum rotation direction and about 10 mm on an upstream side 50*b*.

Figure 8:
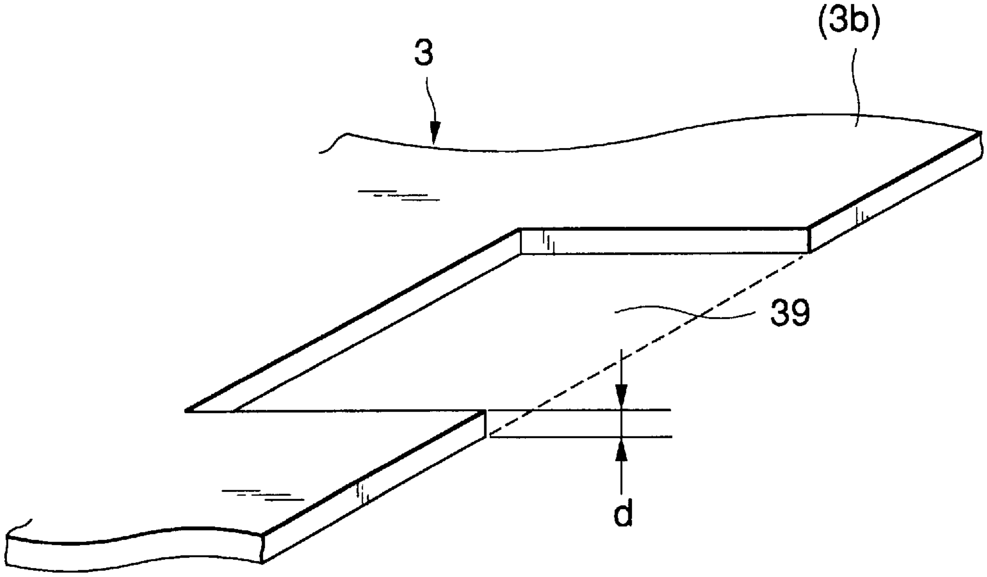
FIG. 8 is a perspective view of the main part to show a level difference formed by a notch of the transfer material holding member.
Figure 9:
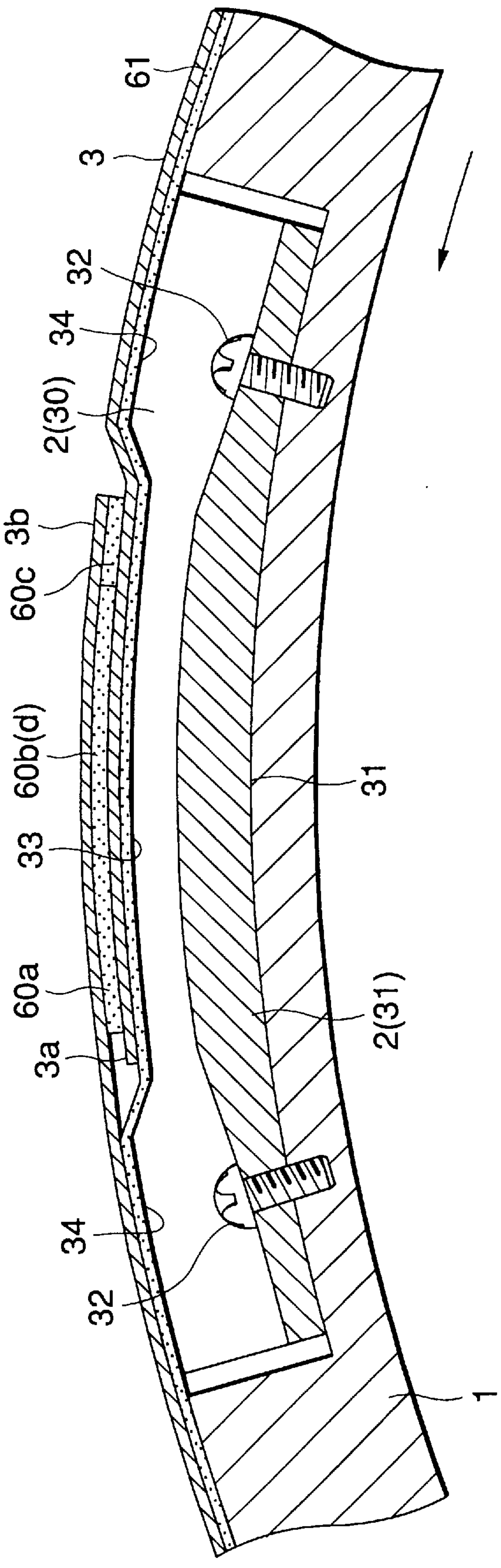
FIG. 9 is a sectional view taken on line VIIII—VIIII of FIG. 3.

Further, if the above-mentioned density sensing patch image is formed on the photosensitive drum 7 (it is formed on the photosensitive drum at a timing corresponding to a non-transfer area of the transfer drum, namely, a drum area in which normally the coupling member exists), as shown in FIGS. 6 and 8, the notch 39 is made corresponding to the patch image in the rear end 3*b* of the drum sheet 3 and a sheet area of the notch 39 forms a level difference d lower than its peripheral sheet areas by the sheet thickness, so that the patch image is not transferred to the transfer drum 4 (drum sheet 3). Therefore, the transfer drum can also be applied without any problems to image formation systems of the type wherein a density sensing patch image as described above is formed.

As we have discussed, since the transfer drum of the invention is of a simple assembly structure with a few number of parts required for attaching the transfer material holding member, the operator (user) can attach and replace the transfer material holding member more accurately and simply without increasing costs.

If an elastic member is attached to the top face of the main body of the coupling member as in the invention, the transfer material holding member, which shrinks due to change of environmental conditions of temperatures, etc., is supported by the elastic member from the inside of the transfer drum, so that the outer peripheral surface height of the transfer material holding member is held constant and stable transfer operation is enabled.

What is claimed is:

1. A transfer drum comprising:

a pair of annular frames, a coupling member for coupling said annular frames, said coupling member having attachment ends and a main body that connects said attachment ends, an elastic member having an attachment portion a transfer material holding member wrapped around said annular frames and having an inner peripheral surface, said transfer material holding member being attached to said annular frames and being out of contact with said main body of said coupling member the attachment portion of the elastic member being attached to said main body of the coupling member and said attachment portion of said elastic member being spaced from the inner peripheral surface of said transfer material holding member.

2. The transfer drum as claimed in claim 1, said main body of the coupling member having a top face, said annular frames each having an outer peripheral surface and said transfer drum having a central axis about which the transfer drum being rotatable, said coupling member is attached so that said top face of said main body is spaced from said central axis radially inside said outer peripheral surfaces of said annual frames, and wherein said transfer material holding member has ends in a circumferential direction overlapped on and bonded to each other at an overlap bonding area and ends in an axial direction stuck to the outer peripheral surfaces of said annular frames and attached so that said transfer material holding member is placed out of contact with the top face of the main body of the coupling member.

3. The transfer drum as claimed in claim 2, wherein each of the attachment ends of said coupling member is attached to a respective annular frame and comprises a transfer material holding member sticking part, said transfer material holding member sticking part comprising a lower face part and top face parts, said lower face part spaced from said central axis radially inside the outer peripheral surface of said annular frame, said top face parts positioned at respective ends of the lower face part and spaced from said central axis at a radial distance equal to the outer peripheral surface of said annular frame, wherein the overlap bonding area of said transfer material holding member is positioned on the lower face part.

4. The transfer drum as claimed in claim 1, wherein said transfer material holding member includes an overlap bonding area, and said transfer material holding member is attached so that said overlap bonding area thereof is positioned above said coupling member.

5. The transfer drum as claimed in claim 1, wherein said main body having a top face, said elastic member is attached to said top face of said main body of said coupling member, said elastic member having ends, and said elastic member attached so that both ends of said elastic member protrude from the main body and approach said inner peripheral surface of said transfer material holding member.

* * * * *